Oct. 14, 1941. J. DUNLOP 2,259,366
ELECTRIC STAIRWAY
Filed Dec. 7, 1940 2 Sheets-Sheet 1
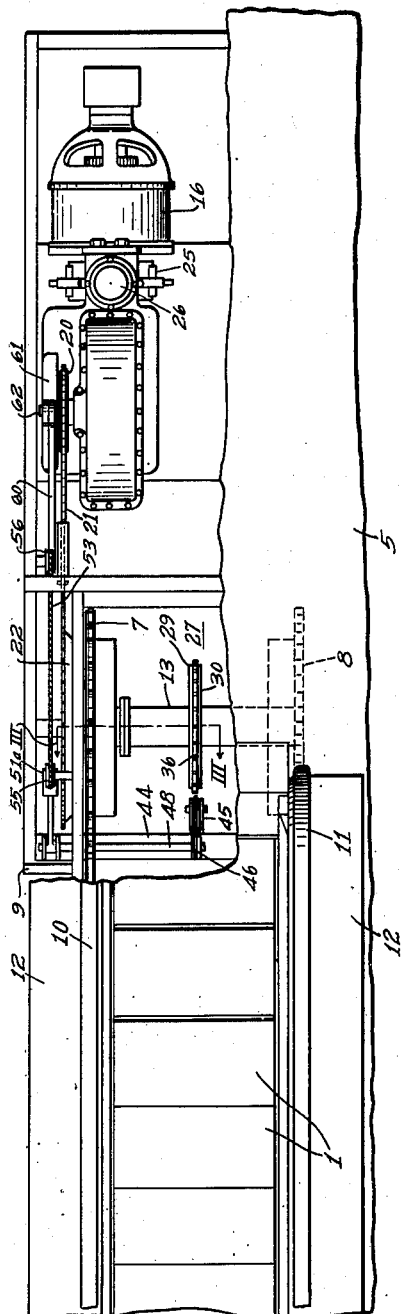
WITNESSES:
INVENTOR
James Dunlop.
BY
ATTORNEY Oct. 14, 1941.    J. DUNLOP    2,259,366
ELECTRIC STAIRWAY
Filed Dec. 7, 1940    2 Sheets—Sheet 2

WITNESSES:
C. J. Weller.

INVENTOR
James Dunlop.
BY
ATTORNEY

Patented Oct. 14, 1941

2,259,366

UNITED STATES PATENT OFFICE 2,259,366

ELECTRIC STAIRWAY

James Dunlop, Ridgewood, N. J., assignor to Westinghouse Electric Elevator Company, Jersey City, N. J., a corporation of Illinois Application December 7, 1940, Serial No. 369,039

7 Claims. (Cl. 198—16)

My invention relates to moving stairways in which the moving steps are operated by endless gear chains disposed on a plurality of sprocket wheels and more particularly, to emergency brakes for stopping such stairways when their driving apparatus breaks.

In moving stairways it is desirable to provide a service brake on the motor for holding the steps when they stop and also an emergency brake for stopping the stairway steps and preventing their movement if a break occurs in the driving chain between the motor and the steps. The emergency brakes are controlled and placed in operation by electrical circuits usually associated with electromagnets. Consequently, when the stairways are shut down, the emergency brakes are usually set because the brake circuits are deenergized. Before the stairways can be started again, even in normal shut downs, the electromagnets must be energized and, in some cases it is even necessary to start the stairways in the opposite direction to effect a release of the emergency brake. Furthermore, if the emergency brake circuit is interrupted accidentally, the emergency brake is jammed on even though there is no need for an emergency stop.

Therefore, one object of my invention is to provide a moving stairway emergency brake which will operate automatically to stop its stairway when its driving apparatus breaks but only when such driving apparatus breaks.

Another object is to provide an emergency brake for stopping moving stairways which shall be purely mechanical in construction and operation and which shall not be affected by any electrical circuits or electrical conditions associated with the stairway.

It is also an object to provide a moving stairway emergency brake operated by mechanical members which will be in movement to a limited extent whenever the stairway is in operation so as to facilitate inspection of the brake.

A further object is to provide an emergency brake which shall be simple and inexpensive to construct and install and to maintain in operative condition.

For a better understanding of my invention, reference may be had to the accompanying drawings, in which:

Figure 1 is a top plan view of one end portion of a moving stairway with part of the flooring and the stairway construction broken away to disclose the structural features of my invention;

Fig. 2 is a view in side elevation of the stairway construction shown in cross section;

Figure 3:
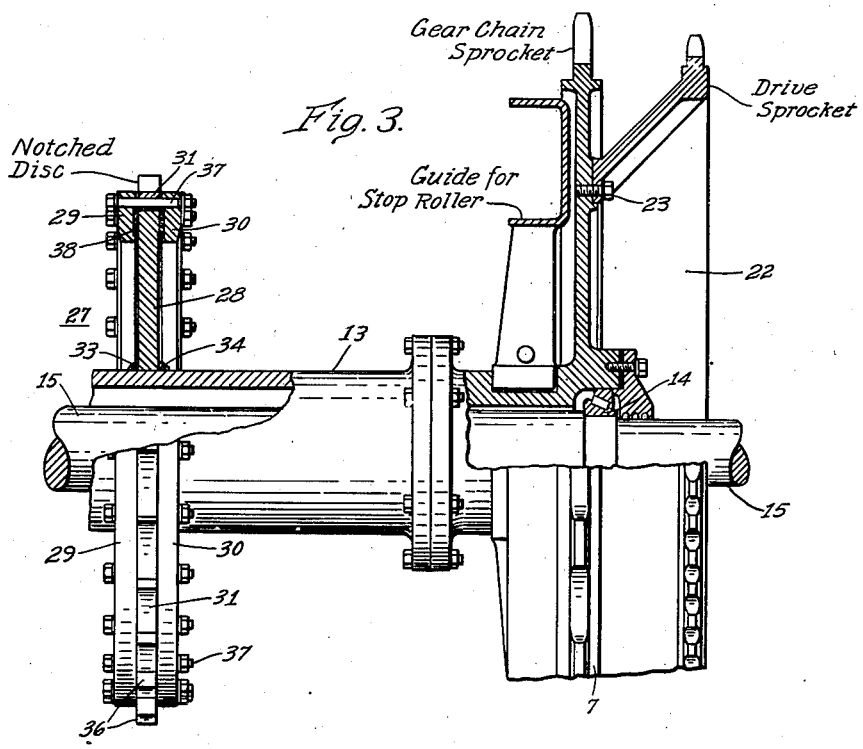
Figure 4:
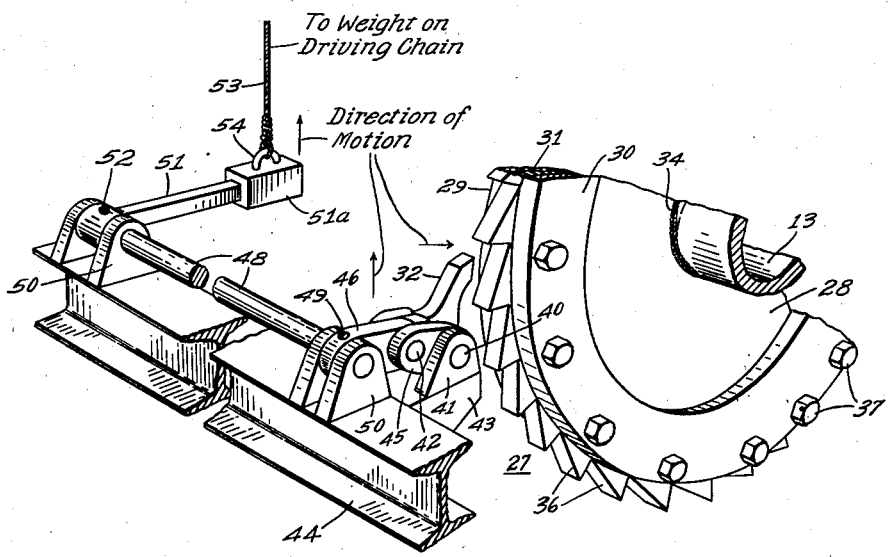

Fig. 3 is an enlarged detail view in front elevation of a portion of my improved safety brake, the torque tube to which it is attached and the driving sprockets therefor being indicated by the line III—III of Fig. 1, parts of these pieces being broken away to disclose their interior construction more clearly; and Fig. 4 is an enlarged view in perspective of a portion of my improved safety braking apparatus.

Referring more particularly to the drawings, I have illustrated a moving stairway comprising an endless series of movable steps 1 disposed to be operated along their tracks 2 and 3 by a pair of gear chains 4 between an upper landing 5 and a lower landing (not shown). The gear chains are supported at the upper landing by a pair of chain sprocket wheels 7 and 8 and at the lower landing in any suitable manner as by a pair of tensioned sprocket wheels such as are shown in the E. M. Bouton Patent No. 2,088,460, issued July 27, 1937.

A suitable truss or frame 9 of structural steel is provided for supporting the stairway steps between the upper landing and its lower landing. A pair of travelling hand rails 10 and 11 are disposed on suitable balustrades 12 at the sides of the stairway steps for assisting the passengers in maintaining their position on the steps while they are moving from one floor to another.

The chain sprocket wheels 7 and 8 are positively connected by a sheave or torque tube 13 and are mounted by suitable roller bearings 14 upon a supporting shaft 15, the outer ends of which may be seated in suitable standards. (not shown).

A motor 16 is provided for driving the chain sprocket wheels 7 and 8 through a driving shaft 17, a worm gear 18, a worm wheel 19, a driving sprocket 20, a driving chain 21, and a bell-shaped driving sprocket wheel 22 which is securely attached to one side of the gear chain sprocket wheel 7 and concentric therewith by a plurality of bolts 23 (Fig. 3).

A service brake 25 is mounted on the motor shaft 17 for stopping the motor and the stairway when in the course of normal operation it is desired to bring the stairway to rest. Any suitable brake may be employed, such as a spring applied electromagnetically released type of brake similar to those usually associated with electric motors. When the electromagnetic coil 26 of the brake is deenergized, the brake will be applied to the motor shaft to prevent rotation of the motor and operation of the driving chain 21 and the stairway steps.

An emergency brake 27 is provided for stopping the stairway steps in case a break occurs in the driving chain 21. The emergency brake comprises a brake disk 28, a pair of brake rings 29 and 30 for engaging the sides of the brake disk, a ratchet-toothed spacing ring 31 for mounting the brake rings on the brake disk and preventing their rotation with the disk when braking action is required, and a pawl 32 for preventing rotation of the ratchet ring when it is to effect a braking action by the braking rings. The disk 28 is mounted on the central portion of the torque tube 13 concentric therewith and is positively fastened thereto by welded joints 33 and 34 so that it becomes structurally integral therewith.

The spacing ring 31 is disposed around the periphery of the disk 28 and concentric therewith and is provided on its outer face with a plurality of ratchet teeth 36 for the pawl 32. The brake ring 29 is mounted on one side of the spacing ring and the brake ring 30 is mounted on its other side by a plurality of bolts 37 which pass through the brake rings and the spacing ring to hold them together and clamp the brake rings against the sides of the disk 28. Each brake ring is provided with a brake lining 38 disposed to bear against the brake disk 28. The pressure of the brake rings against the sides of the brake disk may be adjusted by tightening or loosening the bolts 37.

The friction between the brake rings and the braking disk causes the brake rings and the spacing ring unit to rotate with the braking disk at all times under normal circumstances.

The pawl 32 is pivotally supported in proximity to the ratchet teeth by a pin 40 in a pair of bearing supports 41 mounted on a supporting arm 43 fixed on an H beam 44, the outer ends of which are secured to the stairway frame 9. A pair of arms 45 are mounted on the body of the pawl in position to extend rearwardly into engagement with one end of a link 46 which is attached thereto by a pin 42. The other end of the link is fixed on the inner end of a rocker shaft 48 by a set screw or bolt 49. The shaft is rotatably supported in a plurality of bearing studs 50 mounted on the upper face of the H beam. An operating arm 51, provided with a weighted end 51a is fixed on the outer end of the shaft by a set screw or bolt 52. The weighted end 51a should be sufficiently heavy to bias the pawl 32 out of engagement with the ratchet teeth 36.

The means for operating the arm 51 to move the pawl into engagement with the ratchet teeth comprises a cable 53, one end of which is tied to a staple 54 on the free end of the operating arm, and the other end of which passes upwardly over a pulley 55, thence horizontally to a second pulley 56 and then downwardly to a shoe 57 to which it is attached by a holder 58.

The shoe 57 is seated on the upper central section of the driving chain 21 and is maintained in its position by a link 60, one end of which is pivotally mounted on the frame 61 by a bolt 62.

The weight of the shoe 57 and the weight of the operating arm 51 should be so proportioned that, under normal operation of the stairway, the shoe will be supported by the driving chain in such position that the pawl 32 will be held out of engagement with the ratchet teeth 36 so that the brake shoes and spacing ring will be free to rotate with the drive quill 13 connecting the drive sprockets. The weight of the shoe 57 should be sufficient, however, in case the drive chain breaks and lets it fall, to pull the cable and thus cause the pawl to move into engagement with the teeth on the ratchet ring and thereby prevent the stairway from running in its down direction.

It will be assumed that the stairway is operating in its down direction and that the driving chain suddenly breaks. The breaking of the driving chain causes the shoe 57 (Fig. 1) to drop downwardly, thus pulling the cable 53 to raise the operating arm 51 (Fig. 4). The upward movement of the arm 51 rocks the shaft 48 in a counter-clockwise direction, thus tilting the arm 46 to raise the rear ends of the arms 45 and thereby tilt the pawl 32 into engagement with the ratchet teeth 36. The engagement of the pawl 32 with the teeth 36 stops rotation of the ratchet ring and the brake ring. The resulting braking action of the brake linings on the brake disk causes the stopping of the stairway. When the drive chain is repaired, the shoe 57 is again supported by it, thus releasing the pawl 32 from the ratchet teeth and thereby restoring the safety brake to its normal condition.

It will be obvious that the shoe will rise and fall slightly with the normal movements of the driving chain but the normal rising and falling of the shoe will not be sufficient to cause the setting of the pawl against the brake. However, the slight normal movement of the shoe will be transmitted to the pawl and, by observation, it can be readily seen that the pawl is free and in condition for action if the drive chain breaks. There is nothing static to get corroded. Under these conditions, no friction will develop to render the brake ineffective in an emergency when this movement is occurring.

By the foregoing construction, it is seen that I have provided a safety brake for moving stairways which is simple in design, entirely mechanical in operation, and which will be placed in operation only when the driving chain breaks.

Although I have illustrated and described only one embodiment of my invention, it is to be understood that modifications thereof and changes therein may be made without departing from the spirit and scope of the invention.

I claim as my invention:

1. A moving stairway comprising an endless series of steps, a pair of sprocket wheels, a pair of gear chains disposed over the sprocket wheels for operating the steps, a motor, a flexible power transmitting member operable by the motor to rotate the sprocket wheels, a mechanical brake attached to the sprocket wheels, and mechanical members associated with the flexible power transmitting member and responsive to breakage of that member for operating the brake to stop the sprocket wheels.

2. A moving stairway comprising an endless series of steps, a pair of sprocket wheels, a pair of gear chains disposed over the sprocket wheels for operating the steps, a driving motor, a driving chain operated by the motor for rotating the sprocket wheels, a mechanical brake attached to the sprocket wheels, a shoe disposed to ride on the driving chain, and mechanical members connected to the shoe and the brake and responsive to downward movement of the shoe effected by gravity in the event of breakage of the driving chain for actuating the brake to stop the sprocket wheels.

3. A moving stairway comprising an endless series of steps, a pair of sprocket wheels, a pair of gear chains disposed on the sprocket wheels for moving the steps, a driving motor, a driving chain disposed to be operated by the motor for rotating the sprocket wheels, a mechanical brake attached to the sprocket wheels, a pawl for operating the brake, a shoe pivotally disposed on the driving chain, and a flexible member connected to said shoe and said pawl and responsive to movement of the shoe in the event of breakage of the driving chain for causing engagement of said pawl to apply the brake.

4. A moving stairway comprising a frame, an endless series of steps disposed thereon, a pair of sprocket wheels, a pair of gear chains disposed over the sprocket wheels for operating the steps, a torque tube firmly connecting the sprocket wheels, a mechanical brake mounted on the central portion of the torque tube, a driving motor, a driving wheel attached to the sprocket wheels, a driving chain connecting the motor and the driving wheel, a shoe disposed to ride on the driving chain, a pawl pivotally mounted on the frame for operating the brake, a rocker shaft disposed on the frame, said shaft having its one end extended to one side of the frame, and mechanical members connecting the extended end of the shaft and the shoe and responsive to a predetermined movement of the shoe in the event of breakage of the driving chain for actuating the shaft and the pawl to effect application of the brake to prevent down operation of the stairway steps.

5. A moving stairway comprising an endless series of steps, a pair of sprocket wheels, a pair of gear chains disposed on the sprocket wheels for operating the steps, a torque tube firmly connecting the sprocket wheels, a brake disk fixed on the torque tube, a ratchet ring rotatably disposed on the disk, a pair of brake rings mounted on the ratchet ring in frictional engagement with the disk, a driving motor, a driving chain disposed to be operated by the driving motor for rotating the sprocket wheels, a shoe disposed to ride on the driving chain, and means responsive to downward movement of the shoe in the event of breakage of the driving chain for stopping the ratchet ring to cause the friction between the brake disk and the brake rings to prevent downward movement of the stairway.

6. A moving stairway comprising a frame, an endless series of steps disposed thereon, a pair of sprocket wheels, a pair of gear chains disposed on the sprocket wheels for operating the steps, a driving motor, a driving chain disposed to be operated by the driving motor for rotating the sprocket wheels, a shoe disposed to ride on the driving chain, a brake attached to the sprocket wheels, a rocker shaft mounted on the frame with its one end connected to the brake and its other end extended to one side of the frame, and mechanical members connecting the extended end of the shaft and the shoe and responsive to downward movement of the shoe in the event of breakage of the driving chain for operating the shaft and the brake to prevent downward operation of the stairway.

7. A moving stairway comprising an endless series of steps, a sheave for moving said steps, means for driving said sheave comprising a motor, a flexible power transmitting member extending from said motor to said sheave, a brake mounted on said sheave, a pawl for engaging said brake to thereby cause said sheave to resist rotary movement, mechanism held substantially in a predetermined position by said flexible member, and a second flexible member extending between said mechanism and said pawl, whereby movement of said mechanism out of said predetermined position will cause said pawl to engage said brake mechanism.

JAMES DUNLOP.